United States Patent [19]

Gagnon

[11] 3,775,902
[45] Dec. 4, 1973

[54] TOY TURNA-PULL

[76] Inventor: Robert A. Gagnon, Star Route 2, Box 944, Trail, Oreg. 97541

[22] Filed: Feb. 22, 1972

[21] Appl. No.: 228,212

[52] U.S. Cl. .................... 46/244 A, 46/213, 46/214
[51] Int. Cl. ............................................ A63h 33/26
[58] Field of Search ................ 46/244, 214, 201, 46/213

[56] References Cited
UNITED STATES PATENTS

| | | | |
|---|---|---|---|
| 2,852,888 | 9/1958 | Howard | 46/214 X |
| 3,570,180 | 3/1971 | Oda | 46/244 A |
| 2,732,659 | 1/1956 | Howard | 46/214 X |
| 3,508,789 | 4/1970 | Gazdarica | 46/214 X |
| 2,586,239 | 2/1952 | MacKenzie | 46/244 A |

Primary Examiner—Louis G. Mancene
Assistant Examiner—D. L. Weinhold
Attorney—Clarence M. Crews

[57] ABSTRACT

A toy dump truck (turna-pull) is provided which is adapted for electrical operation from a remote control station. The truck includes front and rear sections connected through a vertical pivot. The rear section includes a pair of supporting wheels which may be fast on a transverse shaft and a carrying tray which is tiltable back and forth between a level carrying position and a sharply tilted dumping position. The forward section includes traction wheels which may be selectively, individually driven forward or backward for setting the wheels to travel in a curved or straight path when both are subsequently, simultaneously operated in the same direction. Reversible motors are provided for each of the front wheels and for the rocking of the tray. The remote control station includes a current supply means, such as a dry cell or a rechargeable power unit, and all required switches, enclosed in a common housing. All conductors which run between the control station and the vehicle form parts of a single cable.

4 Claims, 7 Drawing Figures

PATENTED DEC 4 1973 3,775,902

INVENTOR:
ROBERT A. GAGNON
by: Clarence M. Crews
HIS ATTORNEY

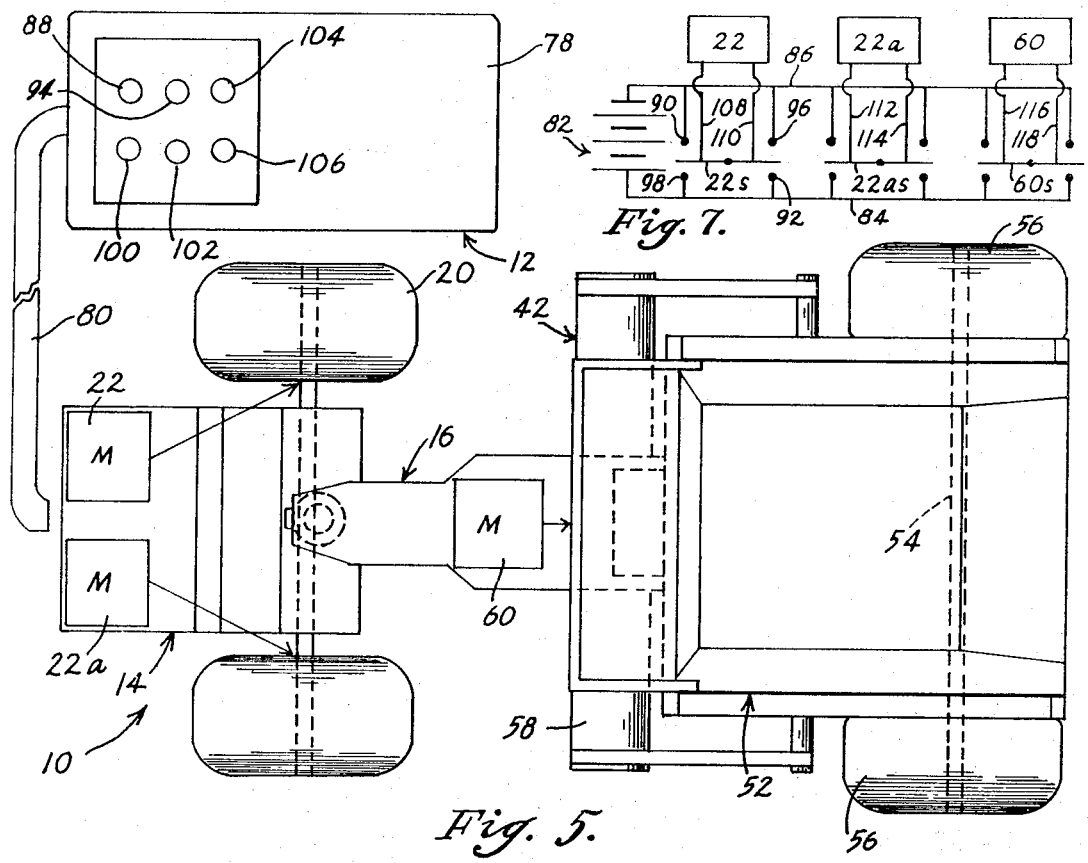
Fig. 5.
Fig. 7.
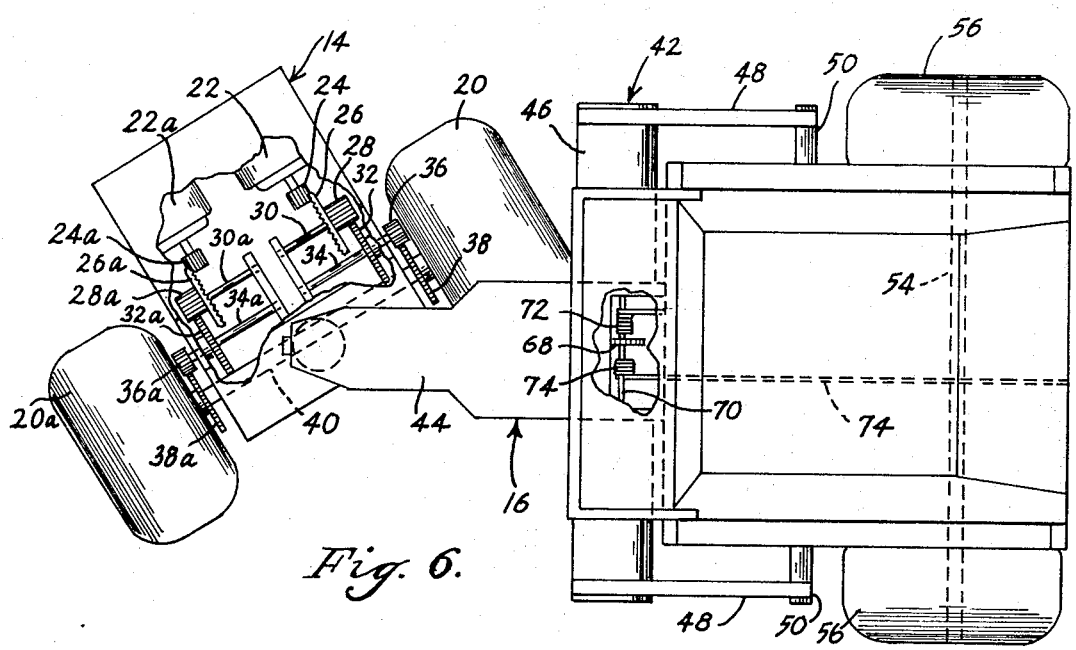
Fig. 6.
INVENTOR:
ROBERT A. GAGNON
by: Clarence M. Evans
HIS ATTORNEY

TOY TURNA-PULL

This invention relates to a novel toy vehicle, chiefly intended for use by young children, and intended to simulate the type of dump truck which is commonly known as a turna-pull.

It is an important feature that the vehicle is operable by remote control from an electric battery or a rechargeable power supply unit, to turn right or left, to run forward or backward, and to tilt an earth carrying tray back and forth between a level transporting position and a tilted dumping position.

It is a still further feature that the above operations are effected through three reversible motors on the vehicle, one for each driving wheel and one for the tray, each motor being controlled by a forward switch and a reverse switch from a power supply unit, such unit and switches being combined into a compact, remote operating unit which can be conveniently held in one hand of the user.

Other objects and advantages will hereinafter appear.
In the drawing forming part of this specification, FIG. 1 is a view in side elevation, partly broken away to reveal otherwise concealed operating structure;

FIG. 5 is a plan view of the entire organization, showing the vehicle, the remote control unit and connections between the vehicle and such unit;

FIG. 6 is a plan view of the vehicle with the front section turned sharply relative to the rear section, and with portions of the structure broken away to reveal otherwise concealed operating gearing; and FIG. 7 is an electrical diagram.

Figure 3:
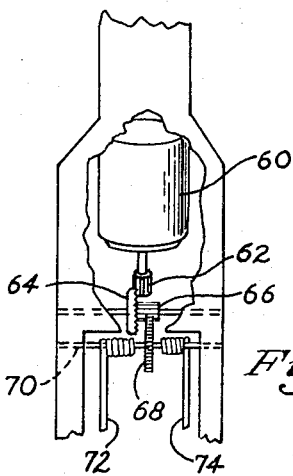
FIG. 3 is a fragmentary view in front elevation, partly broken away to reveal details of the tray operating means.

As has been indicated, the novel toy takes the form of an earth carrying dump truck 10 which simulates a familiar, full size machine known as a truna-pull, and which can be remotely operated from a control unit 12 to receive sand or other cargo at a receiving station, to carry it to a discharge station, there to dump the load, and then to return empty to the same or another receiving station.

The vehicle 10 comprises a forward tractor section 14 and a rear trailer section 16. The two sections, 14 and 16, are connected to one another through a universal joint member 18 which provides for relative lateral rocking to permit independent accommodation of the two sections to irregularities of the terrain, and also to permit (like a fifth wheel) a turning of the tractor section relative to the trailer section for steering purposes.

The forward tractor section 14 includes right and left traction and supporting wheels 20 and 20a which may be (1) individually operated forward or backward or simultaneously operated in opposite directions for steering purposes, or (2) simultaneously operated forward for advancing the vehicle, or (3) simultaneously operated backward for backing the vehicle. The drives for the right wheel 20 and the left wheel 20a are essentially duplicates of one another. The drive for the right wheel will be described in detail and corresponding reference characters will be applied to corresponding parts of the left wheel driving means, with the postscript a added in each instance, without description, but with the understanding that the left wheel drive is duplicative of the right wheel drive.

A reversible direct current electric motor 22, through a gear 24, drives a relatively large crown gear 26 which has fast with it a comparatively small gear 28, the gears 26 and 28 being revolubly mounted upon a transverse shaft 30. The gear 28 drives a larger gear 32 which is fast upon a transverse shaft 34. The shaft 34 also has fast upon it a small gear 36 which drives a comparatively large gear 38. The gear 38 is, like the wheel 20, revolubly mounted upon a transverse shaft 40, and is affixed to the wheel 20 for driving the wheel in unison with itself.

There is nothing critical about the particular step-down gearing described. Resort could be had to bevel gears, worms and worm wheels or other conventional step-down gearing.

In point of fact, the step-down gearing is intentionally made to leave the wheels somewhat over-sensitive to operation of the motor. This is considered desirable, as a challenge, because it makes necessary the development of considerable skill, through practice, to produce a smooth and completely satisfactory response at the first attempt. The usual jeering and cheering between playmates has much to do with the popularity of the toy.

When the wheel 20 is individually driven forward the vehicle may be oriented for turning toward the left and when it is driven backward the vehicle may be oriented for turning toward the right. Corresponding individual operations of the wheel 20a will, of course, have precisely the opposite effects.

Simultaneous forward operation of the wheels 20 and 20a may drive the vehicle straight ahead if the wheels 20 and 20a are pointed straight ahead, or such operation may turn and advance the vehicle in whatever direction the wheels are set for.

The rear section of the vehicle 10 comprises a rigid structure 42 having a central forwardly extending tongue 44 through which the rear section is pivotally connected to the universal joint 18, a transverse member 46 and rearwardly extending arms 48. The arms 48, at their rear ends carry inwardly directed, aligned stub shafts 50, through which a load carrying tray 52 is pivotally connected to the rigid structure 42.

The tray 52 is supported for pivotal movement at its rear end by a transverse shaft 54 that extends between rear, right and left non-traction wheels 56. The wheels 56 are made fast upon the shaft 54 but they could just as well be made freely rotatable on the shaft.

In the normal, substantially level, load carrying position of the tray 52, a forward extension 58 of the tray rests upon the rigid member 42. Provision is made, however, for tilting the tray backward for dumping and forward for restoring it to its normal position.

Figure 2:
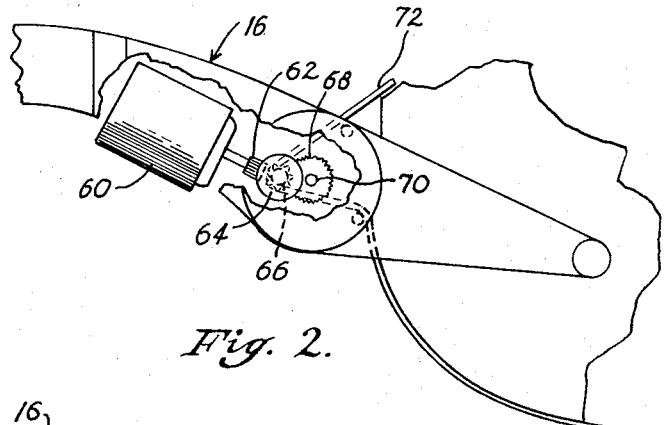
FIG. 2 is a fragmentary view in side elevation showing particularly the carrying and dumping tray and operating means therefor.
Figure 1:
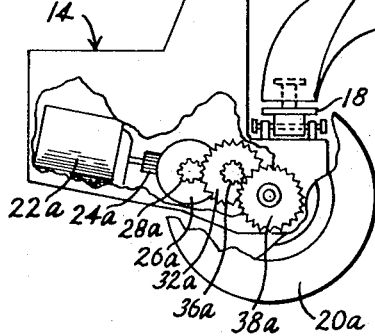
Figure 4:
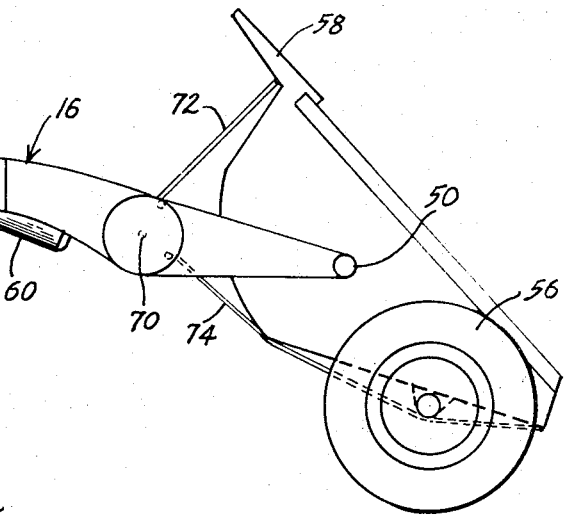
FIG. 4 is a view in side elevation of the truck with the tray in dumping position.

A motor 60, mounted on the member 16 through appropriate reducing gearing comprising gears 62, 64, 66 and 68, drives a shaft 70 (FIGS. 1, 2, 3, 4 and 6) forward or backward at the will of the operator.

The shaft 70 has a flexible line 72 wound on it in a clockwise direction (see FIG. 6), and a flexible line 74 wound on it in a counterclockwise direction.

Clockwise rotation of the shaft 70 reels in the line 72 which is connected to a forward portion of the tray 52 for moving the tray from the tilted dumping position to the nearly level carrying position.

Counterclockwise rotation of the shaft 70 reels in the line 74 while paying out the line 72. This moves the tray from the carrying position to the dumping position.

All operations are controlled from the light and compact remote, electrical control unit 12 which includes a housing 78 for a dry cell or a small rechargeable power unit, (not shown), and a set of manually operable switches. All electrical conductors from the unit 76 to the vehicle are combined into a flat cable 80, which insulates the conductors from one another.

The circuitry of the motors 22, 22a and 60 is diagrammatically shown in FIG. 7. The several reversible motors and their controls are essentially duplicates of one another. Each motor includes a permanent magnet for maintaining a field of unvarying characteristics and provision is made for energizing the armature selectively from a battery or other source of electrical energy through reversible armature connections.

A battery 82, which may form part of the remote operating unit, has its positive and negative terminals permanently connected to conductors 84 and 86. Pivotal switch members 22s, 22as and 60 s normally occupy open positions. The opposite ends of each of these members are conductive but the ends are insulated from one another. The opposite ends of 22s are constantly connected with motor 22 thorugh conductors.

A control button 88 may be depressed for swinging lever 22s clockwise to close one end of 22s upon a negative terminal 90 and the opposite end of 22s upon a positive terminal 92, whereby to cause current to flow through the armature of motor 22 in the direction to produce forward rotation of the front right wheel 20. Operation will cease as soon as pressure on the button is relieved.

A control button 94 may be depressed for swinging lever 22s counterclockwise to close one end of 22s upon a positive terminal 96 and the opposite end of 22s upon a negative terminal 98, thereby to cause current flow through the armature of motor 22 in the direction for driving the front right wheel 20 backward.

The drive of the other motors is similarly controlled, the depression of button 100 being effective to drive the front left wheel forward, and the depression of button 102 being effective to drive the front left wheel backward.

Similarly, depression of button 104 operates motor 60 in a direction to tilt the tray to or toward dumping position, while depression of button 106 operates motor 60 in the direction to restore the tray to the level position.

It is the motor connected conductors 108, 110, 112, 114, 116 and 118 which run from the control unit 76 to the motors on the truck. These conductors, insulated from one another, are combined into a single flat cable 80, of any desired length, which will have little tendency to foul the running gear of the truck and can easily be kept out of harm's way.

I have described what I believe to be the best embodiment of my invention. What I desire to protect by letters patent is set forth in the following claims.

I claim:

1. A remotely operated toy turna-pull which comprises, in combination, a. a forward tractor section having two independently operable, transversely aligned, front traction drive wheels
   b. a rear, trailer section comprising
   b1. a rigid rearwardly extending combined tongue-and-yoke, together with universal connecting means supporting the forward tongue end of the tongue-and-yoke from the tractor section with freedom for relative lateral tilting, of the two sections about a longitudinally extending horizontal axis, and for relative turning of the two sections about a vertical axis located substantially in the vertical plane of the tractor section drive wheel centers,
   b2. a load carrying, tiltable tray pivotally connected substantially midway of its length to the rear, yoke end of the tongue-and-yoke, with freedom for tilting about a transverse horizontal axis between a generally horizontal loading and running position and a sharply tilted dumping position,
   b3. a pair of idler free running road bearing wheels, rotatively connected to the rear end of the tray, and
   c. operating means for the front traction drive wheels and the tray including distinct reversible motors on the vehicle for each of said traction wheels and for the tray, and manually operable, remote, motor control means operative selectively
   c1. to tilt the tray from running position to dumping position or vice versa,
   c2. to operate either front wheel forward individually or either front wheel backward individually,
   c3. to drive the front wheels forward or backward in unison, or
   c4. to drive the front wheels simultaneously in opposite directions for turning the tractor section about substantially a fixed center without materially moving the trailer section.

2. A remotely operated mechanical toy as set forth in claim 1 in which a fixed common transverse supporting shaft is provided for the traction wheels and the traction wheels are mounted on said shaft with freedom for revolution relative to said shaft and to one another.

3. A remotely, manually operated mechanical toy in the form of a dump truck, which comprises, in combination, a. a forward tractor section having two traction wheels and distinct drive means for independently driving the individual wheels forward or backward,
   b. a rear, wheel-supported trailer section, together with means connecting the trailer section to the tractor section with freedom for relative turning of the two sections about a vertical axis, the trailer section also including a tray tiltable about a transverse horizontal axis between a generally horizontal running position and a tilted, dumping position, and
   c. driving means for tilting the tray forward and backward between said positions, the tray drive from the motor being through a common shaft of small diameter and two oppositely wound cables on said shaft, so that the shaft serves as a common element of two winches. with a first line wound in as the second is paid out, and vice versa, the first line being connected to tilt the tray as it is reeled in and the second line being connected to level the tray as it is reeled in.

4. A mechanical toy as set forth in claim 3 in which the trailer section supporting wheels are connected to the rear end of the tray, as drawn forward relative to the tractor section as an incident of dumping, and are caused to retreat relative to the tractor section as an incident levelling out of the tray.

* * * * *

UNITED STATES PATENT OFFICE
CERTIFICATE OF CORRECTION

Patent No. 3,775,902    Dated December 4, 1973

Inventor(s) Robert A. Gagnon

It is certified that error appears in the above-identified patent and that said Letters Patent are hereby corrected as shown below:

Column 4, line 64, "as" should read -- are --.

Column 4, line 67, before "levelling" insert the word -- of --.

Signed and sealed this 30th day of April 1974.

(SEAL)
Attest:

EDWARD M. FLETCHER, JR.
Attesting Officer

C. MARSHALL DANN
Commissioner of Patents